Oct. 11, 1932.  W. L. McNAMARA  1,881,825
TRANSFERRING AND FORMING MACHINE
Filed July 12, 1929

Inventor
William L. McNamara
By his Attorney

Patented Oct. 11, 1932

1,881,825

UNITED STATES PATENT OFFICE

WILLIAM L. McNAMARA, OF CONNELLSVILLE, PENNSYLVANIA, ASSIGNOR TO CAPSTAN GLASS COMPANY, OF CONNELLSVILLE, PENNSYLVANIA, A CORPORATION OF DELAWARE

TRANSFERRING AND FORMING MACHINE

Application filed July 12, 1929. Serial No. 377,649.

The present invention relates to the manufacture of glassware and more particularly to a glass forming machine.

In the usual practice, glassware when produced by a glass blowing machine comes from the machine in a semi-plastic state. In the larger pieces of ware it is desirable to support certain portions thereof until they have cooled sufficiently to hold their proper form. This is more particularly true of the bottoms of large bottles or demijohns. The bottoms of these, being thicker than the other portions thereof, do not cool as rapidly and if unsupported directly after leaving the glass blowing machine, they are likely to sag in places due to their softness, thus making them defective. Attempts have been made to avoid this by having operators lay such glassware aside until it has properly cooled but, since the bottoms of the ware are usually arched, this does not prevent sagging of this part which will, of course, increase the size of the container and make it unmarketable. In addition, the manual labor required for laying the containers aside and again picking them up at a later time increases substantially the cost of the articles and increases substantially the breakage. In many instances, containers are not permitted by the operators to remain sufficiently long to completely cool.

The present invention aims to overcome the above objections by providing a machine simple in construction and operation, adapted to receive containers of various heights, support the bottoms and other portions thereof during the cooling operation, and thereafter to deliver the bottles directly to a conveyor or other machine for subsequent operations. The period of time during which the articles are permitted to cool is definitely fixed, the shape of the bottoms is definitely determined, and the labor of removing the articles and again picking them up is eliminated by automatic mechanism for transferring the containers to the machine and from the machine to the conveyor.

Described generally, the machine comprises an automatic transfer device for engaging the upper ends of the containers and delivering the containers to small elevators on a rotatable table. The elevators have movable bottoms properly shaped to hold the bottoms of the containers in their proper shape. These bottoms are held against the arch shaped bottoms of the containers until they have properly cooled and are automatically removed so that the containers can be readily transferred from the table to a suitable conveyor for subsequent operations. The table may be rotated by the glass blowing machine so that the respective elevators are automatically positioned, without timing mechanisms, for the reception of the containers delivered by the transfer mechanism. The size of the table and the position of removal is such that a predetermined time interval elapses during the forming operation, which is sufficiently long to permit the glass to cool the desired amount.

An object of the invention is to provide an inexpensive machine for forming glassware by supporting and holding the arched portions thereof until they have cooled sufficiently to hold their proper shape.

Another object of the invention is to minimize the labor required in forming glassware and thereby reduce the cost thereof.

Another object of the invention is to provide a bottom forming machine adapted to receive various sizes of glassware from a glass blowing machine, to properly support the glassware while the bottoms are being formed, and thereafter deliver it to a conveyor.

Another object of the invention is to provide a bottom forming machine in which the glassware will be given a predetermined uniform period of time in which to harden.

Another object of the invention is to provide means for the transfer of glass articles from a glass blowing machine to a conveyor, the bottoms of the glass articles being supported and held in proper form during the period of transfer.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein Fig. 1 is a top plan view, shown more or less diagrammatically, illustrating a preferred embodiment of the invention;

Figure 1:
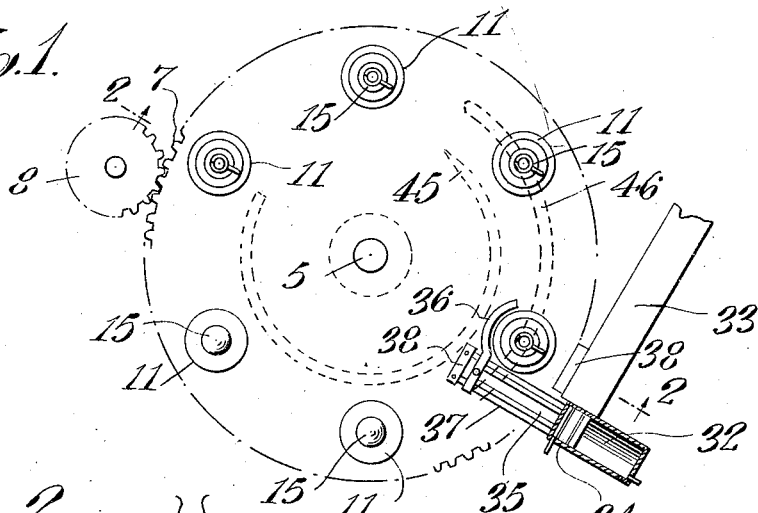

Referring to the drawing, there is shown a bracket 1 bolted to any suitable support such as a machine base 2, which may be the base of the machine with which the present mechanism is intended to operate, having a bearing 4 with a shaft 5 mounted therein. On the upper end of the shaft there is a table 6 rotatably mounted thereon. The periphery of the table has a gear 7 connected through an idling gear 8 to any suitable drive, but preferably connected directly to the rotatable mold table of the glass blowing machine, so that it will be stopped and started in timed relation to the machine to which it is attached and with which it is adapted to operate.

Adjacent the periphery of the table there are a plurality of bearings 9 preferably equal in number to the number of molds on the mold table of the glass forming machine. Suitable elevators 10 fit in the bearings 9 and have a flange 11 adapted to seat in the recesses 12 adjacent the upper ends of the bearings. In this way, the elevators, when in their lower position, are flush with the top of the table. Preferably, the elevators have a mold or plunger 14, the upper end of which is rounded at 15 to conform to the shape of the bottoms of the receptacles or jugs delivered to the forming machine. The upper ends of the molds 14 are enlarged to present a shoulder 16 adapted to rest against the inturned flange 17 on the bottom of the elevators. The downwardly depending part of the plungers 14 has an enlargement 18 adapted to engage the bottom of the elevators and raise them, as described hereinafter.

Figure 2:
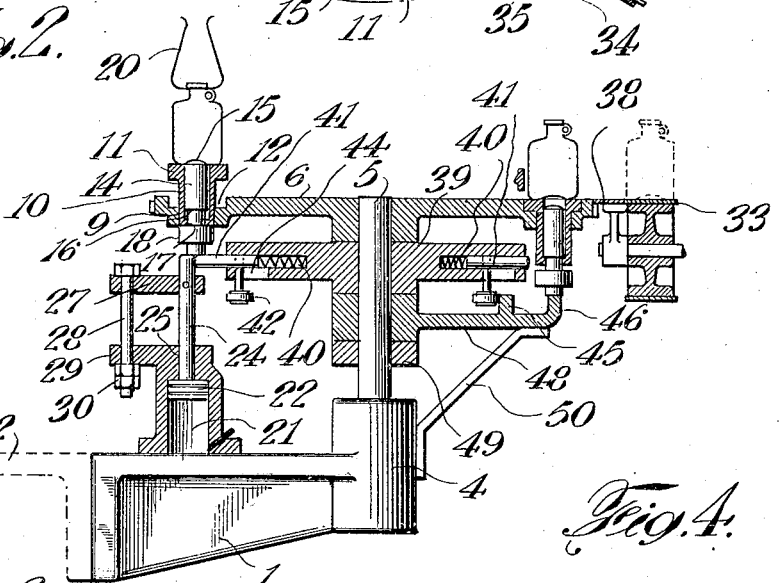
Fig. 2 is a sectional view along the line 2—2 of Fig. 1.

In operating glass fabricating machines, the jugs or jars may be removed from the molds while hot by means of grippers which grip the containers and deliver them at a predetermined point. The present machine is adapted, by means of its timed mechanism or direct connection with the glass machine, to operate with such a transferring mechanism, which is indicated herein at 20. It will be understood that the grippers 20 engage the enlarged upper end of a jar or jug, withdraw it from the mold and deposit it at a predetermined point, as indicated in Fig. 2. The timing of the rotating table 6 is such that one of the elevators will be beneath the jar when it is released.

In order to avoid dropping the jar or the application of too much pressure, there is provided an air cylinder 21 mounted upon the bracket 1 with a piston 22 therein having a piston rod 24 extending upwardly through the bearing 25 in the top of the cylinder. In order to limit the upward movement of the piston 22 and the rod 24, there is provided an extension 27 which may be rigidly attached to the piston rod 24, the outer end of the extension being connected by means of a bolt 28, slidably mounted in the extension 27 and attached at its lower end to an extension 29 by means of the nuts 30. By adjusting the nuts 30, it is possible to limit the upward movement of the elevator 10 within predetermined limits. It will be noted that the plunger 24 engages the mold or plunger 14 and presses it upwardly until the enlargement 18 contacts with the bottom of the elevator 10 raising the elevator a desired amount. The enlargement 18 is suitably placed so that when it is in contact with the bottom of the elevator the curved portion 15 thereof extends upwardly to form a rounded bottom for the container deposited upon the elevator, as indicated on the left side of Fig. 2.

When the elevator is lowered, the curved upper end of the mold 15 drops sufficiently to permit the jar to be moved off the table by a sliding operation. Any suitable mechanism can be provided for this, but, as shown herein, there is an air cylinder 32 attached to the machine having a piston 34 and a piston rod 35 with a vessel engaging member 36 attached to the end thereof. In order to guide the member 36, a pair of rods 37 extend outwardly over the table from the end of the cylinder and are mounted in suitable bearings in the member 36. The operation of this piston and cylinder is such that when the table is stopped, one of the elevators with a jar thereon is positioned directly in front of the curved portion of the member 36, whereupon air is admitted to the upper end of the cylinder to slide the jar from the table to a conveyor 33 which may be the usual form of belt conveyor mounted upon suitable pulleys and having an extension 38 filling the gap between the conveyor and the upper edge of the machine so that a smooth surface will be presented for sliding the jar onto the conveyor.

After the elevator 10 has been raised, as shown on the left side of Fig. 2, it is desirable to retain the mold 14 in contact with the bottom of the jar in order to preserve the proper shape of the jar until the bottom has hardened sufficiently to make it unnecessary to support it. This result is accomplished by means of a member 39, mounted directly below the table and rigidly attached thereto, having recesses 40 therein corresponding to the number of elevators with spring operated plungers 41 resiliently retained in their outward position. Suitable cam rollers 42 are attached to the plungers through slots 44 for co-operating with a cam 45, as shown on the right of Fig. 2, to retract the plungers and to drop the elevators and the mold plungers. In order to ease the elevators down to their lower position there is provided a cam 46 which preferably is of sufficient height to engage the end of the plunger 14 when the cam 45 operates to retract the supporting plunger. The cam 46 permits the elevator to descend slowly until it reaches the station adjacent the rake-off mechanism where the elevator is flush with the table. At this point, the sharp declination in the cam permits the plunger 14 to drop into its lower position so that there will be no obstruction to the movement of the jar. The cams 45 and 46 may be mounted in any suitable manner and are shown herein as a part of the casting 48 mounted on the shaft 5 and held in position by the collar 49 and bracket 50. The forward end of the cam 46 may be tapered to facilitate engagement of the lower ends of the plungers 14 prior to the disengagement of the spring operated supporting plungers 41.

Figure 3:
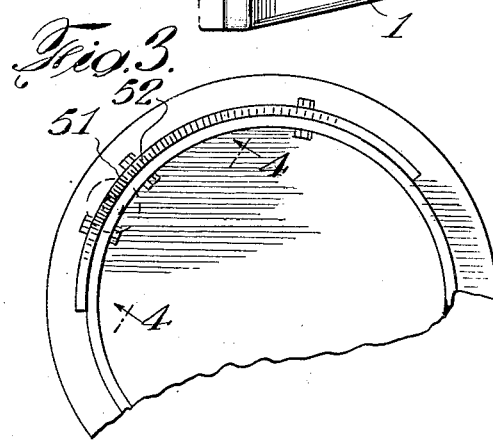
Fig. 3 is a fragmentary view of another embodiment of the invention.
Figure 4:
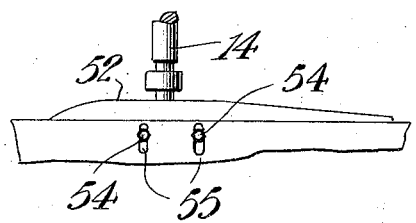
Fig. 4 is a sectional view along the line 4—4 of Fig. 3 illustrating an adjustable cam for determining the height of the elevators.

Figures 3 and 4 illustrate a different form of the invention wherein an adjustable cam 51 may be substituted for the cam 46 shown in Figs. 1 and 2, with an adjustable part 52, herein shown as a cam surface having a horizontal top and depending sides, which is attached to the cam 51 by means of bolts 54 in slots 55. By adjusting the bolts, the cam 52 may be moved upwardly to any desired position so that the height of the elevator 10 when a jar is being deposited thereon may be made any suitable amount. It will be understood that the adjustable part 52 is directly under the delivery mechanisms 20 for depositing jars on the elevator. The cam 51 may extend completely around the machine having a suitable drop adjacent the rake-off mechanism permitting the plunger 14 to drop completely at this point so that the jar may be readily removed. Preferably, however, the cam extends until slightly ahead of the station where the jars are deposited and slightly beyond the station where they are removed. During the remaining portion of the travel the elevators may be in their lower position.

In the operation of the device, the glass machine fabricates suitable jugs or jars at a rate of some twenty or thirty a minute, the mold table thereon stopping at intervals for the several operations. The grippers 20 engage a jar and deposit it on an elevator 10 during the stop periods of the mold table. The table 6 is moved in timed relation with the glass machine by means of the gear 7 on the outer periphery thereof and the idling gear 8 connected to the driving mechanism of the glass machine or directly to the glass machine. Just prior to the delivery of a bottle to the elevator, air is admitted to the lower end of the cylinder 21 to raise the piston and the piston rod 24 upwardly to engage the plunger 14, whereupon a recess in the cam 45 permits the plunger 41 to move outwardly and engage under the lower end of the plunger 14 holding the elevator in its upper position until the cam 45 retracts the plunger 41, whereupon the cam 46 lowers gradually the elevator to its lower position flush with the top of the table. At a suitable point in its movement, the jar stops in front of the rake-off mechanism and the member 36, operated by the air cylinder 32, slides the jar across the table onto the conveyor 37 where it may be delivered to a suitable annealing leer. It will be understood that the successive elevators are raised as each reaches the station for the delivery of a jar thereto and is lowered, as described above, as it moves around to the rake-off mechanism.

In Figs. 3 and 4, a slightly different mechanism is shown wherein an adjustable cam 51 is adapted to raise and lower elevators for receiving and delivering the jars. By adjustment of the cam 52 in Figs. 3 and 4 or by adjustment of the nuts 30, in Fig. 2, it is possible to raise the elevators the exact height to accommodate the particular height of jar without making more elaborate adjustments in the jar delivering mechanism or other parts of the glass machine. Then, too, the air cylinder has a cushion effect which avoids breakage and is well adapted to the work.

It will be seen that the present invention provides a mechanism which may be attached directly to a glass machine and the vessels delivered therefrom may be properly supported in contact with the air until they have cooled sufficiently to make it unnecessary to furnish further support. The mechanism is simple in construction and eliminates the handling of the ware by operators. Each article is permitted to cool a predetermined period independently of the skill of the operator, and the jars are automatically placed on the machine and automatically removed, thereby eliminating the labor required and decreasing the cost of the ware. As various changes may be made in the form, arrangement and construction of the parts in the above embodiment without departing from the spirit of the invention, it is to be understood that all matter herein is to be interpreted as illustrative and not in a limiting sense.

Having thus described my invention, I claim:

1. In a device of the class described, the combination of a table, a plurality of means for forming the base of glassware, a reciprocating member for placing said means in operative position, a plunger extending radially outward from said table adapted to maintain said first means in operative position for a predetermined interval, and a cam for moving said plunger out of operative position.

2. In a device of the class described, means comprising an elevating supporting member for forming parts of glassware, a plunger disposed in said means, and an extending member attached to said plunger, said member being adapted to actuate said elevating table when said plunger is operated.

3. In a device of the class described, the combination of an elevating supporting member, a mold adapted to form the bottom of glassware, a reciprocating plunger for raising said mold and table, mechanism for operating said plunger, and means for retaining said mold and table in elevated position for a predetermined period.

4. In a device of the class described, the combination of a rotatable table, a plurality of receiving stations on said table, means for elevating and lowering said receiving stations, means for delivering articles to said receiving stations, and means for transferring the articles at a predetermined point from said receiving stations.

5. In a device of the class described, the combination of a table, a plurality of molds for forming the base of glassware placed thereon, a member adapted to raise said molds into operative position, devices for raising said member, a longitudinal plunger adapted to maintain said molds in an elevated position, a spring member for holding said plunger in effective position, and a cam member for moving said plunger out of effective position to facilitate the lowering of said molds.

6. In a device of the class described, the combination of means for depositing articles on a rotating table or turret at a predetermined receiving station, means for varying the height of said receiving station, and means for transferring said articles from said rotating table at a given point in the rotation thereof.

7. In a device of the class described, the combination of a table, a plurality of molds for forming the base of glassware, mechanism for raising and lowering said molds, a second table below said first table having a plurality of radially extending apertures therein, and members slidably mounted in said apertures for maintaining said molds in an elevated position, means on said members adapted to engage a cam, a cam member having a definite curvature for shifting said members, and resilient members for holding said means against said cam member.

8. In a device of the class described, a receiving station, means for elevating and maintaining said receiving station at various elevations to accommodate different sizes of articles delivered, and means for lowering said receiving station.

9. In a device of the class described, a receiving station, a mold associated with said receiving station, means to raise and lower said receiving station, and means to raise and lower said mold.

10. In a device of the class described, a plurality of receiving stations, a mold within each of said receiving stations, and means for elevating and lowering said receiving stations and molds.

11. In a device of the class described, the combination of receiving stations with a mold associated with each receiving station, means for elevating and lowering said receiving stations and molds, and means for controlling the magnitude of the elevating and lowering movement of said receiving stations and molds.

12. In a device of the class described, the combination of a rotating table or turret with receiving stations thereon, means for controlling the rotary movement of said table, and means for raising and lowering said receiving stations.

13. In a device of the class described, the combination of a rotary table or turret with receiving stations thereon, means for delivering articles to said receiving stations, and means for elevating and lowering said receiving stations.

14. In a device of the class described, the combination of a rotating table or turret, vertically movable receiving stations thereon, a mold associated with said receiving stations, and means for transferring articles at a predetermined point from said receiving stations.

15. In a device of the class described, the combination of a rotating table having movable members thereon, means for raising said members to receive a jar, means for lowering said members, and means for removing the jars from the lowered members, said second means comprising an air cylinder operated responsively to the movement of said table, and a pusher arm operatively connected to the cylinder and adapted to engage the ware.

16. In a device of the class described, the combination of means for forming parts of glassware, a member for elevating said means into operative position, a radially extending plunger for maintaining said first means in elevated position, means associated with said plunger adapted to engage a cam member, and a cam member adapted to engage said last means, whereby said plunger is removed and said first means are adapted to be lowered.

WILLIAM L. McNAMARA.